United States Patent
Allison, III et al.

(10) Patent No.: US 7,697,512 B1
(45) Date of Patent: Apr. 13, 2010

(54) PROACTIVE MONITORING OF STATUS OF VOICE-OVER-IP SERVERS

(75) Inventors: Jones E. Allison, III, Madison, AL (US); James A. Mabry, Madison, AL (US)

(73) Assignee: Adtran, Inc., Huntsville, AL (US)

( * ) Notice: Subject to any disclaimer, the term of this patent is extended or adjusted under 35 U.S.C. 154(b) by 844 days.

(21) Appl. No.: 11/460,099

(22) Filed: Jul. 26, 2006

Related U.S. Application Data

(60) Provisional application No. 60/703,069, filed on Jul. 28, 2005.

(51) Int. Cl.
*H04L 12/66* (2006.01)
*G06F 15/00* (2006.01)
(52) U.S. Cl. .................... 370/352; 709/227; 379/900
(58) Field of Classification Search ................ 370/252, 370/216–220, 241, 254, 351–356, 395.2; 709/209, 223–229, 201–205; 702/118–123; 379/32.01, 100.05, 205.06, 900
See application file for complete search history.

(56) References Cited

U.S. PATENT DOCUMENTS

| | | | | |
|---|---|---|---|---|
| 6,920,410 B2 * | 7/2005 | Southam et al. | ............. | 702/122 |
| 6,940,849 B2 * | 9/2005 | Eichen et al. | ................ | 370/352 |
| 7,436,820 B2 * | 10/2008 | Beck et al. | ................... | 370/352 |
| 2003/0118011 A1 * | 6/2003 | Wu et al. | ..................... | 370/356 |
| 2005/0228895 A1 * | 10/2005 | Karunamurthy et al. | .... | 709/229 |
| 2006/0034185 A1 * | 2/2006 | Patzschke et al. | ........... | 370/252 |
| 2006/0165064 A1 * | 7/2006 | Brown et al. | .............. | 370/352 |
| 2006/0235980 A1 * | 10/2006 | Pote et al. | .................... | 709/227 |
| 2006/0239252 A1 * | 10/2006 | Kantak et al. | ................ | 370/352 |
| 2008/0201483 A1 * | 8/2008 | Chong et al. | ................. | 709/228 |

* cited by examiner

*Primary Examiner*—Aung S Moe
*Assistant Examiner*—Habte Mered
(74) *Attorney, Agent, or Firm*—Allen, Dyer, Doppelt, Milbrath & Gilchrist, P.A.

(57) ABSTRACT

A server connectivity status testing mechanism of a voice-over internet protocol (IP) communication device is operative to automatically test the connectivity status of each of a plurality of available servers. In response to such testing, server usage is selectively adjusted, as necessary, to ensure that the user is provided with effectively uninterrupted service, and so that the service provider may be immediately alerted to error conditions.

20 Claims, 6 Drawing Sheets

US 7,697,512 B1

PROACTIVE MONITORING OF STATUS OF VOICE-OVER-IP SERVERS

CROSS-REFERENCE TO RELATED APPLICATION

The present application claims the benefit of co-pending patent application Ser. No. 60/703,069, filed Jul. 28, 2005, by J. Allison, III et al, entitled: "Voice-Over-IP Server Proactive Monitoring," assigned to the assignee of the present application and the disclosure of which is incorporated herein.

FIELD OF THE INVENTION

The present invention relates in general to communication systems and subsystems thereof, and is particularly directed to a mechanism that is installable within the supervisory communication controller of a voice-over-internet protocol (IP) communication device (through which a user of the internet conducts voice-over-IP communications with a voice-over-IP communication device of another user), and is operative to automatically and proactively monitor the status of the connectivity to each of a plurality of servers through which a voice-over-IP communication session may be conducted between the voice-over-IP devices. In response to that monitored activity, the mechanism is operative to adjust server usage as necessary, to ensure that the user can be provided with effectively uninterrupted service, and so that the service provider can be more quickly alerted to any error conditions.

BACKGROUND OF THE INVENTION

Voice-over-IP protocol is a digital communication protocol that is built on top of the Internet Protocol (IP) and allows users to exchange voice and other media information (e.g., images/video) by way of voice-over-IP communication devices, such as, but not limited to, telephone devices. A reduced complexity example of a voice-over-IP network is diagrammatically illustrated in FIG. 1 as comprising respective voice-over-IP communication devices 10 and 20, that connect to and exchange messages with a voice-over-IP server 30 during a communication session (commonly referred to as a call), by way of a communication (IP) network 40, such as but not limited to a local area network (LAN), private wide area network (WAN), or the public Internet. Each of the voice-over-IP communication devices presents an associated user 15 and 25 with an interface that is operative to capture the media to be transmitted to the other device, and an interface that is operative to reproduce the media that is received from the other device.

The role of the server 30 is to coordinate the interaction of multiple voice-over-IP devices, such as devices 10 and 20. In a typical network, a respective voice-over-IP device must be able to establish a communication with its server in order to conduct a communication session with another voice-over-IP device since, without a connection to a server, the voice-over-IP device is not capable of making a call. As diagrammatically illustrated in FIG. 2, in order to provide redundancy, a voice-over-IP device 100 may be configured to be connected to any of a plurality of servers 110-1, 110-2, ..., 110-n, by way of associated network paths, shown as networks 120-1, 120-2, ..., 120-n. In such a redundancy-based, server-connectivity scheme, in the event of the failure of a single server, such as server 110-1, the device is operative to transition to an alternate or back-up server, such as server 110-2.

A fundamental shortcoming of conventional voice-over-IP communication schemes is the inability of a respective voice-over-IP device to detect whether, prior to placement of a call, it has sufficient connectivity with its available server(s) to determine whether it can actually place a call therethrough. In conventional schemes, it is not until an attempted call has failed that the user is alerted to the fact that the necessary network connectivity with a server is not available. This inability of the voice-over-IP device to transition to a back-up/redundant server until this failure condition is detected increases the amount of time that the user may be required to wait before a call placement can be completed.

In addition to having to address a user's frustration with call placement failure, the provider of voice-over-IP service is also interested in monitoring the quality of each connection. As noted above, a typical voice-over IP device is not able to detect a failure until a call is attempted; yet, the service provider is interested in constantly monitoring the state of the connection with the server, without having to rely upon the user's attempted calls. Detecting the integrity of the IP link between the voice-over-IP device and the outside world is simply not sufficient, as there may exist a multitude of other problems that may prevent the voice-over-IP device from actually communicating with its server, irrespective of the state of the device's local connection and its base IP connectivity to the network.

SUMMARY OF THE INVENTION

In accordance with the present invention, these and other shortcomings of conventional voice-over IP connectivity schemes are effectively obviated by a server connectivity status monitoring mechanism that is installable within the supervisory communication controller of a voice-over-IP communication device, and is operative to automatically and proactively monitor the connectivity status of each of a plurality of available servers. In response to that monitored activity, server usage is adjusted, as necessary, to ensure that the user will be provided with effectively uninterrupted service, and so that the service provider can be more quickly alerted to any error conditions.

To this end, the supervisory communication controller of the voice-over-IP communication device is provided with a prioritized list of servers with which the device may be connected. In the event of an error with a best server (corresponding to whichever server has the highest (a priori) priority among those servers that are currently 'connected'), the device will temporarily divert all calls to the next highest priority server that is currently connected, in order to ensure that voice-over-IP service to the user remains uninterrupted. Priority, which is configurable, may be established in accordance with one or more of device-server configuration, tested available connectivity of each server, and an attempt to place a call through each server. Because the status of the connection between any given server and the voice-over-IP device is continually subject to change, its connection with each server is automatically monitored/tested on a repetitive, preferably regular and periodic, basis.

Any time that a server fails this test, the device will transfer all calls to the next highest priority server of those available (connected), and will alert the service provider of the failure. In the unlikely, but possible, event that all servers have failed the test—a catastrophic error—the service provider is alerted. In addition, the user is alerted to the fact that a connection is currently unavailable, so that a call cannot be successfully made. In addition, the rate at which the testing of the connectivity with each server is repetitively (e.g., periodically) conducted is reduced, so as to avoid causing congestion problems in addition to existing network problems.

Automatic testing of server connectivity is preferably carried out by placing a simulated call from the device, that exercises as many parts of the connection as the voice-over-IP protocol will allow, without actually attempting to connect a call to another voice-over-IP device. If the protocol does not support simulated calls, a response from the server is stimulated by means of another mechanism supported by the protocol, since testing the connection to the server apart from use of the given protocol is insufficient to determine whether a call will succeed or fail.

By automatically, repetitively testing the device's connection with each server on a regular basis, the device is able to maintain and update the ability-to-provide connectivity status of each server by way of a server table. Based on the results of a respective test, this connectivity status of each server entry in the server table will be denoted as 'connected' (representative of the fact that stimulation of the server was successful), or 'not-connected' (indicating that stimulation of the server was unsuccessful). The server table also includes an entry indicating which server has been determined during the updating test to be the 'best' server (the highest priority server that has been successfully contacted), so that all calls may be routed through that server.

In addition to the use of simulated calls to test server connectivity, actual calls that are placed during intervals between the tests may be used to update the current status of the server through which such calls are to be routed. If an attempted call fails to contact the server that is currently designated as the 'best' server entry in the server table, the device will proceed through the remaining servers in the server table, in order of priority, whose statuses are denoted as 'connected'. If all connected servers are unreachable, the device will abort the call, and both the user and the service provider will be notified of the failure.

DETAILED DESCRIPTION

Figure 2:
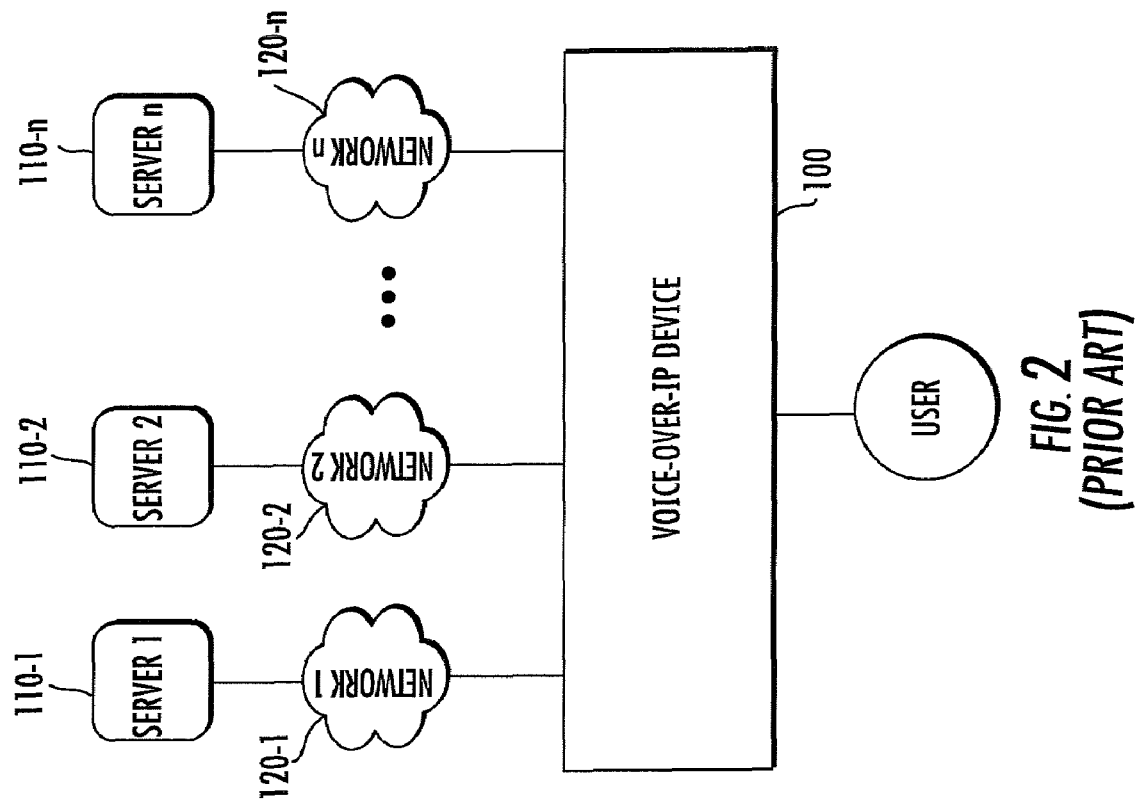
FIG. 2 is a diagrammatic illustration of a voice-over-IP communication network employing a plurality of servers for back-up redundancy.
Figure 1:
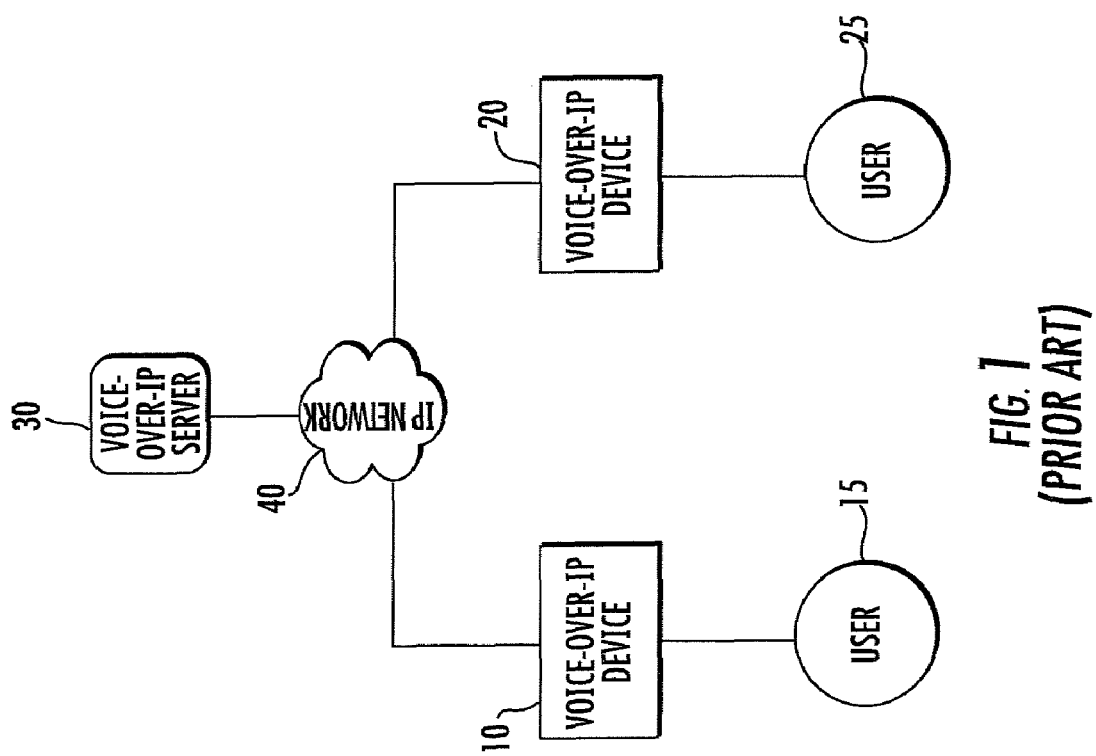
FIG. 1 is a diagrammatic illustration of a reduced complexity example of a voice-over-IP communication network.

Before describing the new and improved proactive voice-over IP server connectivity monitoring scheme in accordance with the present invention, it should be observed that the invention resides primarily in a modular arrangement of conventional digital communication transceiver and signal processing circuits and components therefor. In a practical implementation that facilitates packaging in a hardware-efficient equipment configuration, these modular arrangements may be readily implemented as field programmable gate array (FPGA)-, or application specific integrated circuit (ASIC)-based chip sets. Consequently, the configuration of this modular arrangement of circuits and components, and the manner in which they are interfaced with one another have, for the most part, been illustrated in the drawings by readily understandable block diagrams, which show only those specific details that are pertinent to the present invention, so as not to obscure the disclosure with details which will be readily apparent to those skilled in the art having the benefit of the description herein. The diagrammatic illustrations are primarily intended to show the major components of the invention in a convenient functional grouping, whereby the present invention may be more readily understood. In the Figures, like numbers refer to like elements throughout.

Figure 3:
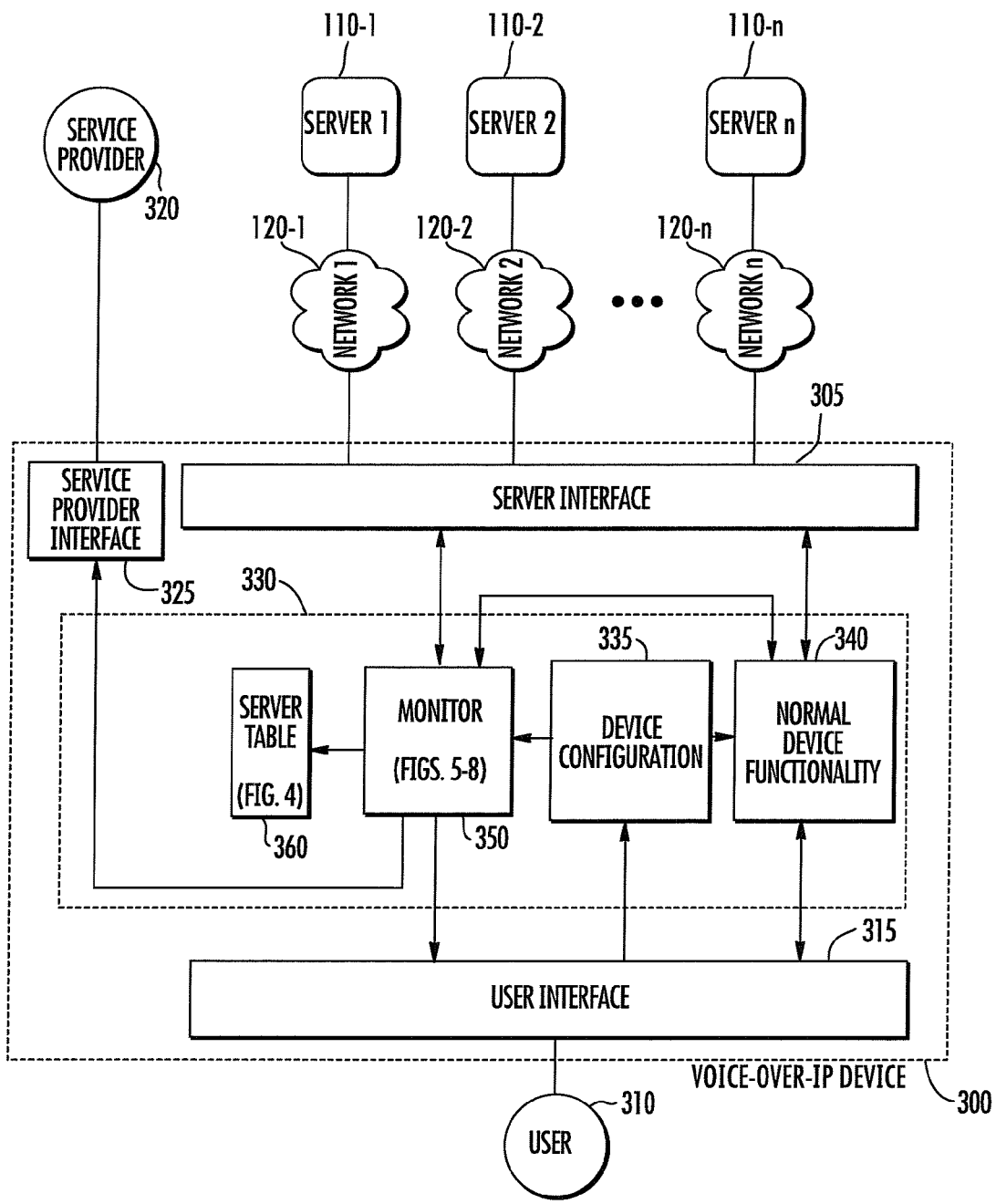
FIG. 3 diagrammatically illustrates the overall architecture of a non-limiting, but preferred embodiment of a voice-over IP device that incorporates the proactive server connectivity monitoring scheme in accordance with the present invention.

Attention is now directed to FIG. 3, which diagrammatically illustrates the overall architecture of a non-limiting, but preferred embodiment of a voice-over IP device that incorporates the proactive server connectivity monitoring scheme in accordance with the present invention. The device itself is shown in broken lines 300 and, as in the redundancy arrangement of FIG. 2, described above, is configured to be connected to any of a plurality of servers 110-1, 110-2, . . . , 110-n, by way of associated networks 120-1, 120-2, . . . , 120-n. Connection to the plurality of network paths and their associated servers is effected by way of a standard server interface 305 which may be of the type customarily employed in typical voice-over-IP devices. A user 310 interacts with the device by way of a standard user interface 315, which may also be of the type customarily employed in conventional voice-over-IP devices. Through this interface, the user is able to initiate outbound call sessions to another device, be alerted to inbound call sessions from another device, as well as configuring the device, in a conventional manner.

In addition to the server and user interfaces, the device also contains a standard service provider interface 325 through which messages may be transmitted to the service provider 320, as necessary. Like interfaces 305 and 315, service provider interface 325 may be of the type customarily employed in conventional voice-over-IP devices. Each of interfaces 305, 315 and 325 is controlled by a set of communication control modules within a supervisory communication control processor 330, through which the device is able to initiate and receive voice-over-IP sessions using one or more voice-over IP protocols.

For this purpose, the control processor includes a standard device configuration module 335, which contains a list or table of the voice-over-IP servers 110-1-110-n, to which the device may attempt to connect, as well as the priority of each respective server. As described previously, priority, which is configurable, may be established in accordance with one or more of device-server configuration, tested available connectivity of each server, and an attempt to place a call through each server. The configuration module is also programmed with a retry limit value, which represents the maximum number of successive connectivity retries that may be attempted when contacting a server, before a connectivity failure is issued. Associated with device configuration module 335, and coupled with the respective server and user interfaces 305 and 315 is a conventional 'normal' device functionality module 340, through which device 300 initiates and receives voice-over-IP sessions using one or more voice-over IP protocols in a conventional manner.

In addition to these conventional communication control modules, control processor 330 further includes a monitor module 350 and a server table 360 (shown in FIG. 4), that provide the voice-over-IP device with the additional proactive server connectivity status monitoring functionality of the present invention. Monitor module 350, which is comprised of a state machine to be described below with reference to FIGS. 5-8, is operative to proactively, or effectively continuously, monitor the status of the connection between the device and each of its servers. Each time the server configuration changes, monitor module 350 is updated with a new list of servers and their priorities, which is then used to update the server table 360. In addition, each time the monitor module 350 (periodically) tests the status of a server connection it updates the server table accordingly. The monitor module 350 may also update the user interface 315 to indicate the status of each connection.

Figure 4:
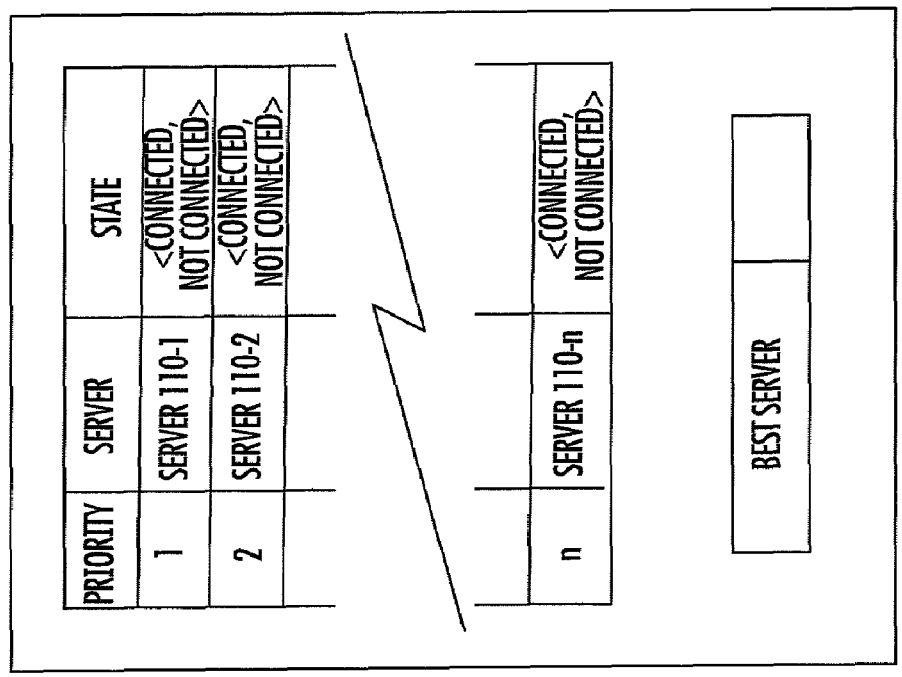
FIG. 4 diagrammatically illustrates a server table.

As shown in FIG. 4, server table 360 contains a list of the servers 110-1-110-*n*, the priority of each server (1 through n, where 1 is the highest and n is the lowest), and the state of the respective connection to each server. The priority of a server is typically designated a priori, namely, when the network link between the device and that server is initially established, and may vary, as servers are added to or deleted from the list. The server table also contains an entry indicating which server is currently the 'best accessible' server. As pointed out above, the monitor module 350 regularly and repetitively (e.g., periodically) updates the server table 360, so that the server table will always specify the most current connectivity state of each server. As shown in FIG. 4, this connectivity state is designated as either 'connected' or 'not-connected'. When initiating a call, the 'normal' device functionality module 340 uses the information stored in the server table to connect to the appropriate server, as will be described.

Figure 5:
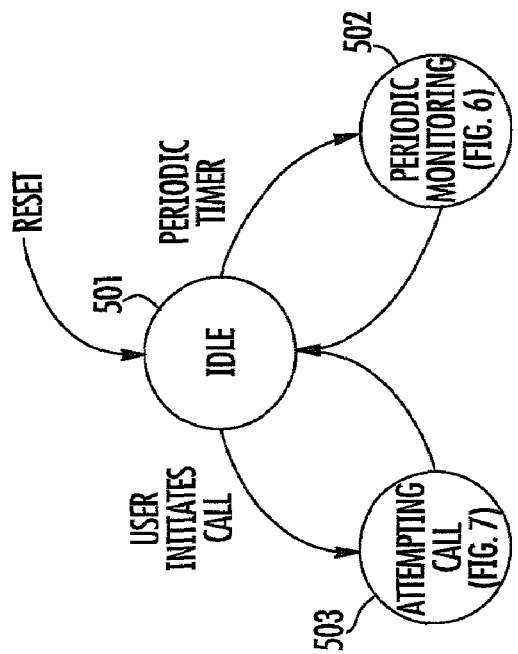
FIG. 5 is a state diagram of the operation of the monitor module of the voice-over IP device of FIG. 3.

As shown in the state diagram of FIG. 5, the monitor module 350 contains three operational states. By default, the monitor module is normally in an idle or quiescent state 501. From this state, the monitor module periodically transitions to a periodic monitoring state 502 in accordance with the operation of a soft-timer, or to a attempting call state in response to the user placing a call.

In the periodic monitoring state, to be described below with reference to the flow chart of FIG. 6, the monitor module attempts to effect a connection with each server, and then updates the server table based upon these attempts. Once each of the server entries in the server table has been updated in accordance with the periodic monitoring routine shown in FIG. 6, the monitor module transitions back to idle state 501. Whenever the user initiates a call, the monitor module transitions from the idle state 501 to an attempting call state 503, to be described below with reference to the flow chart of FIG. 7. In this state, the monitor module is also capable of updating the server table. Once a call set-up has been completed, the monitor module transitions back to the idle state 501.

Figure 6:
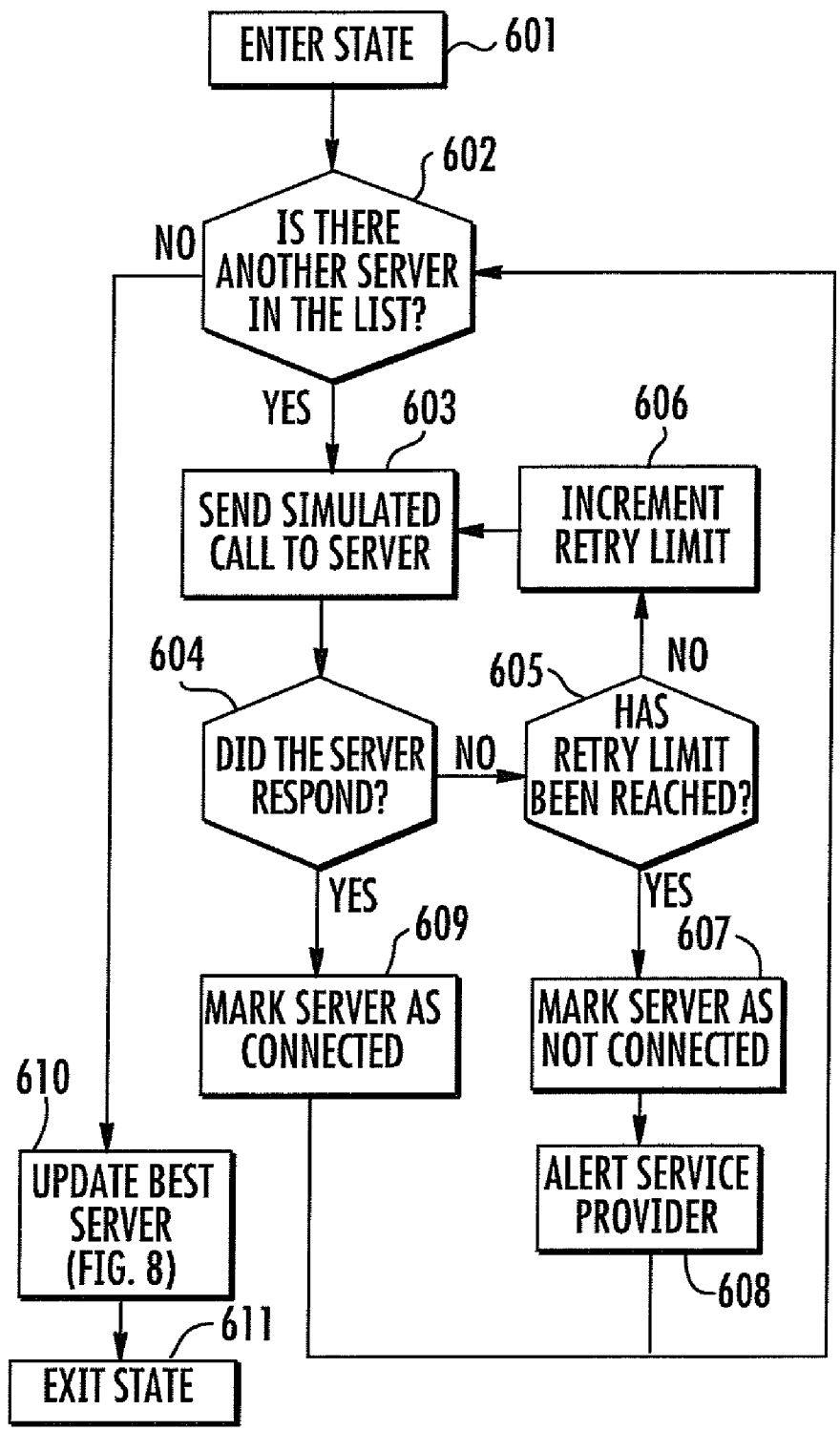
FIG. 6 is a flow chart of respective steps of the repetitive server monitoring and connectivity status-updating routine for the periodic monitoring state of the state diagram of FIG. 5.

Attention is now directed to the flow chart of FIG. 6, which shows the respective steps of the periodic server monitoring and connectivity status-updating routine for the periodic monitoring state 502 of the state diagram of FIG. 5. When the monitor module enters this routine, as shown at step 601, it encounters a query step 602, which determines whether there are any remaining servers listed in the server table whose connection status has not yet been updated during the current periodic update operation. At the beginning of each periodic update state, the answer to query step 602 will be YES, since the connectivity status to each server has yet to be updated during that test.

From query step 602, the routine transitions to step 603, wherein the monitor module 350 causes the server interface 305 to simulate the placement of a call to the designated server (e.g. the first server listed in the server table 360). Preferably, this simulated call step will exercise as many parts of the connection as the voice-over-IP protocol will allow, without placing an actual call.

As a non-limiting example, Session Initiation Protocol (SIP-RFC 3261) has an available OPTIONS request, which any SIP-based device may send to an associated SIP-based server. The SIP server, per the RFC, will respond to the device as though the OPTIONS request were a call. However, the SIP server will not route a call when it receives an OPTIONS request. This allows the SIP-based device to proactively monitor its connection to the SIP server, by simply sending an OPTIONS request to it.

A test of the server connection is considered successful and the server is denoted as being 'connected', when the server responds to the OPTIONS request, no matter what the response may be. On the other hand, testing of the server connection is considered unsuccessful and the server is denoted as being 'not-connected', when the server fails to respond to the OPTIONS request after a programmable/configurable time-out and programmable/configurable number of retries.

If, in step 603, the protocol being employed does not support simulated calls, the monitor module causes the server interface to stimulate a response from the server by means of another mechanism that is supported by the given voice-over-IP protocol. Testing the connection to the server apart from use of the given voice-over-IP protocol is not sufficient to determine whether a call will succeed or fail.

Next, in query step 604, the routine determines whether the server has responded to the simulated call. If the answer to query step 604 is NO (indicating that the simulated call placement has failed), the routine transitions to query step 605 to determine whether or not the retry limit value has been reached. As described above, the retry limit value represents the maximum number of successive connectivity retries that may be attempted when contacting a server, before a server connectivity failure is issued.

For the initial simulated call attempt, which is not a retry, the answer to query step 605 is NO, causing the routine to transition to step 606, wherein a retry counter is incremented, and the routine transitions back to step 603. However, if, after some number of call retries, the contents of the retry counter reach the retry limit, the answer to query step 605 will be YES, causing the routine to transition to step 607, wherein the current connection status entry in the server table is updated as 'not-connected'. (The default connection status entry for each server is initially 'not-connected', until the first time that the device tests the connections to each server. Thereafter, the connection status entry will depend upon the results of the test.)

From step 607, the routine transitions to an alert service provider step 608, wherein a 'server failed' message is transmitted to the service provider 320 by way of the service provider interface 325, to advise the service provider that the identified server could not be contacted. From the alert service provider step 608, the routine transitions back to query step 602. If the answer to query step 604 is YES (indicating that the simulated call placement has been successful), the routine transitions to step 609, wherein the connection status entry in the server table is updated as 'connected'. The routine then returns to query step 602.

Once each server entry in the server table has been updated, the answer to query step 602 will be NO, indicating that there are no remaining servers listed in the server table whose connection status needs to be updated during the current periodic update operation, and the routine transitions to step 610. In step 610, the 'best' server of those entries designated as 'connected' in the updated server table is selected in accordance with the update best server sub-routine shown in the flow chart of FIG. 8, to be described. Once the best server has been selected in step 610, the routine transitions to exit step 611, whereupon the monitor module transitions back to the idle state 501.

Figure 7:
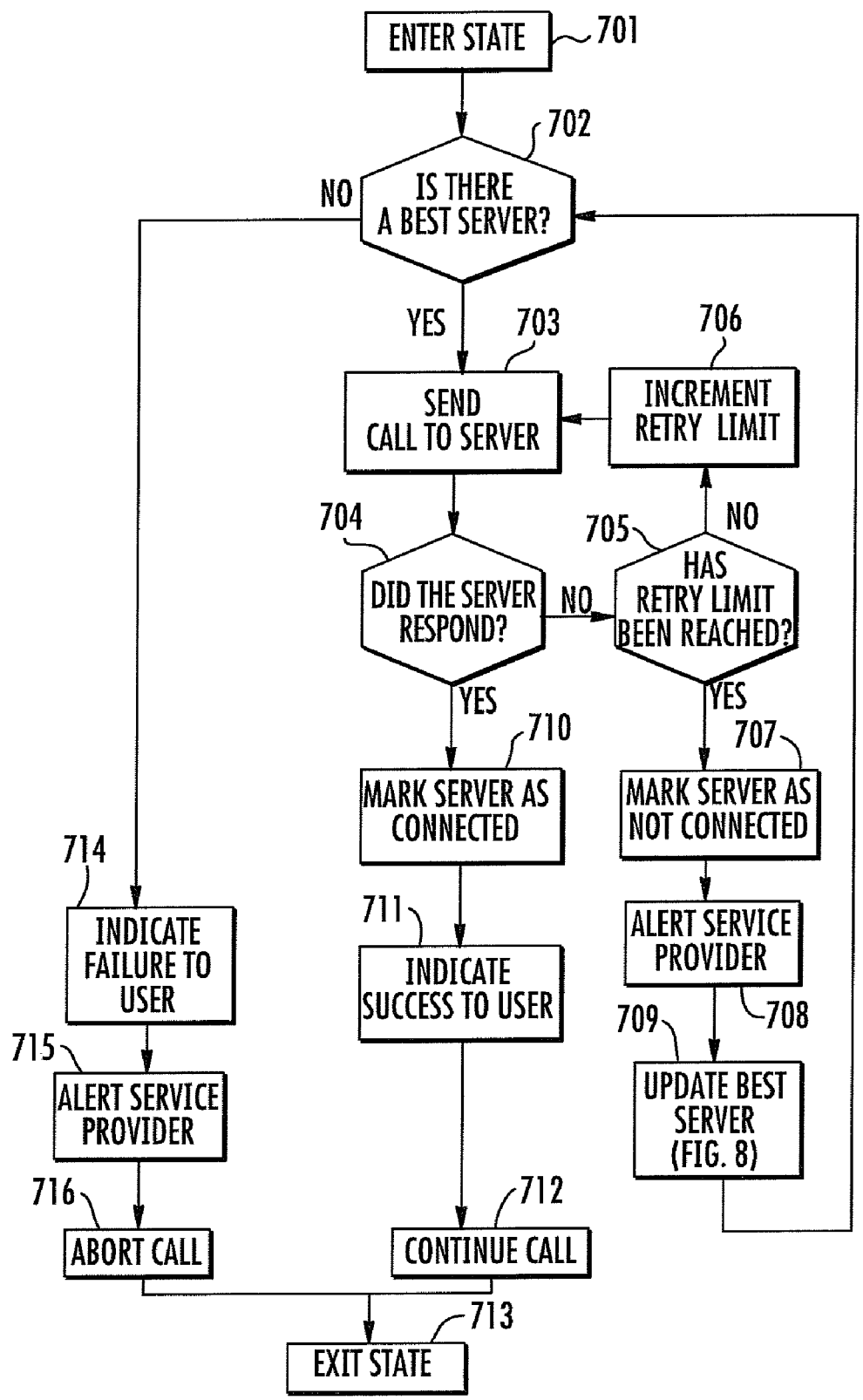
FIG. 7 is a flow chart of respective steps of the attempting call routine for the attempting call state of the state diagram of FIG. 5.

FIG. 7 shows the respective steps of the attempting call routine for the attempting call state 503 of the state diagram of FIG. 5. When the monitor module enters the routine at step 701, it encounters a query step 702, which determines whether or not the server table contains a best server entry. If the answer to query step 702 is YES (indicating that the server table contains a best server entry), the routine transitions to step 703, wherein the monitor module 350 causes the server interface 305 to place a call to the currently designated 'best' server. Next, in query step 704, the routine determines whether the 'best' server has responded to the call.

If the answer to query step 704 is NO (indicating that the call placement has failed), the routine transitions to query step 705 to determine whether or not the retry limit value has been reached. For the initial call attempt, the answer to query step 705 is NO, causing the routine to transition to step 706, wherein the retry counter is incremented, and the routine transitions back to step 703. However, if, after some number of call retries, the contents of the retry counter reach the retry limit, the answer to query step 705 will be YES, causing the routine to transition to step 707, wherein the connection status of the 'best' server entry in the server table is updated as 'not-connected'. The routine then transitions to alert service provider step 708, wherein a 'server failed' message is transmitted to the service provider 320 by way of the service provider interface 325, to advise the service provider that the identified 'best' server could not be contacted. From the alert service provider step 708, the routine transitions to step 709. In step 709, the 'best' server of those entries designated as 'connected' in the server table is selected in accordance with the update best server sub-routine shown in the flow chart of FIG. 8, to be described. Once the best server has been updated in step 609, the routine transitions back to step 702.

If the answer to query step 704 is YES (indicating that the call has been successfully placed to the best server), the routine transitions to step 710, wherein the connection status entry of the best server entry in the server table is updated as 'connected'. Next, in step 711, the successful placement of the call is indicated to the user by way of the user interface 315, and the normal device functionality module 340 will continue the call in step 712. Once the call is terminated, the routine transitions to exit step 713, whereupon the monitor module transitions back to the idle state 501.

If the answer to query step 702 is NO (indicating that the server table contains no best server entry), the routine transitions to step 714, wherein the monitor module 350 causes the user interface 315 to indicate a failure to the user. The routine then transitions to step 715, wherein a 'server failed' message is transmitted to the service provider 320 by way of the service provider interface 325, to advise the service provider that the identified server could not be contacted. From the alert service provider step 715, the routine transitions step 716, wherein the call is aborted. As in the case of a call termination, described above, when the call is aborted, the routine transitions to exit step 713, whereupon the monitor module transitions back to idle state 501.

Figure 8:
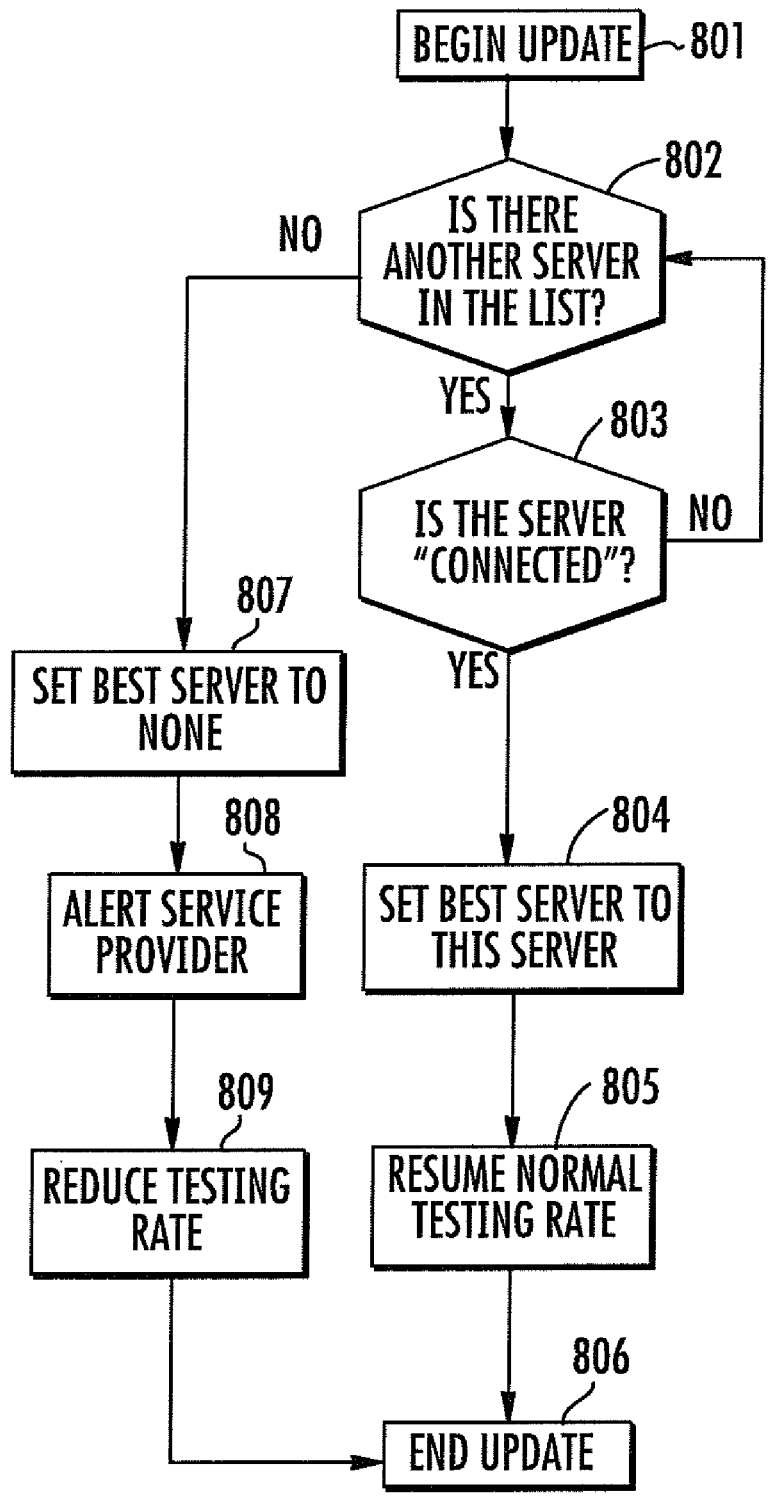
FIG. 8 is a flow chart of respective steps of the update best server sub-routine employed in each of the flow charts of FIGS. 6 and 7.

FIG. 8 shows the respective steps of the update best server sub-routine for steps 610 and 709 of the respective routines shown in FIGS. 6 and 7, described above. When the monitor module enters the update best server routine at step 801, it initially encounters a query step 802. In this step, starting with the highest priority server, a determination is made whether there are any remaining servers listed in the server table. If the answer to query step 802 is YES (indicating that the server table contains at least one remaining server entry), the routine transitions to query step 803, wherein a determination is made whether the currently highest priority server is connected. If the answer to query step 803 is NO (indicating that the current highest priority server is not connected), the routine transitions back to step 802. If the answer to query step 804 is YES (indicating that the current highest priority server is connected), the routine transitions to step 804, wherein the best server entry is replaced by the identity of the current highest priority connected server. Using this server as the current best server, the monitor module will its normal periodic transition to periodic monitoring state 502 (if the periodic transition rate had been previously reduced) in step 805, and then ends the best server update at step 806.

If the answer to query step 802 is NO (indicating that the server table contains no remaining server entry), the routine transitions to step 807, wherein the best server entry is set to 'none'. Next, in step 808, wherein an 'all servers failed' message is transmitted to the service provider 320 by way of the service provider interface 325, to advise the service provider that no connection could be made with any server. From the alert service provider step 808, the routine transitions step 809, wherein the rate of the soft-timer, that controls how often the monitor module transitions to the periodic monitoring state, as described above, is reduced, so that the monitor module will not add congestion problems to the network. The routine then transitions to end update step 806.

As will be appreciated from the foregoing description, shortcomings of conventional voice-over-IP communication devices, including their inability to detect whether, prior to placement of a call, they have sufficient connectivity with available servers to ensure successful placement of a call, as well as the desire of service providers to monitor the quality of each connection with the server, without having to wait until a failure in the attempted placement of a call, are successfully addressed by a server connectivity status monitoring mechanism that proactively monitors the connectivity status of each available server and, in response to that monitored activity, adjusts server usage as necessary, so that the user will be provided with effectively uninterrupted service, and the service provider can be more quickly alerted to any error conditions.

While we have shown and described an embodiment in accordance with the present invention, it is to be understood that the same is not limited thereto but is susceptible to numerous changes and modifications as known to a person skilled in the art. We therefore do not wish to be limited to the details shown and described herein, but intend to cover all such changes and modifications as are obvious to one of ordinary skill in the art.

What is claimed is:

1. A method of controlling placement of a call from a voice-over-internet protocol (IP) communication subscriber device comprising the steps of:
   (a) prior to placing said call, automatically testing, from said voice-over-IP communication subscriber device, available connectivity between said device and each of a plurality of servers through which said call may be placed by eliciting a response from each server in the plurality of servers without establishing a connection for a call by transmitting a Session Initiation Protocol (SIP) request to each server, and if a server fails to respond to a SIP request after a predetermined number of times when the SIP request was transmitted to the respective server to elicit a response, then simulating a response from the server that had not responded to the SIP request using another mechanism that supports voice-over-internet protocol to determine if the unresponsive server can establish a connection and receive a voice-over-internet protocol call, and based on the results of the testing, updating a connection status in a server table that stores data regarding the priority of servers to be called if a voice-over-internet call is to be made; and (b) causing said device to automatically select a server having a higher priority based on the priority of connection status as stored in the server table and based upon said connectivity automatically tested in step (a); and (c) causing said device to attempt to place said call through said selected one of said plurality of servers.

2. The method according to claim 1, wherein step (a) comprises causing said device to automatically repetitively test, at times other than when placement of a call is being attempted, said available connectivity between said device and each of said plurality of servers.

3. The method according to claim 2, and further comprising automatically updating said information contained in said table in accordance with automatic repetitive testing of said available connectivity between said device and each of a plurality of servers, and wherein step (b) comprises causing said device to automatically select said one of said plurality of servers in accordance with said information updated in step (a).

4. The method according to claim 3, wherein step (c) comprises causing said device to automatically update said information representative of available connectivity for said selected one of said plurality of servers, based upon said attempt to place said call through said selected one of said plurality of servers.

5. The method according to claim 3, wherein step (a) further comprises storing, in said table, information representative of a respective priority of each of said plurality of servers, and wherein step (b) comprises causing said device to automatically select said one of said plurality of servers in accordance with said updated information and in accordance with said information representative of a respective priority of each of said plurality of servers.

6. The method according to claim 5, wherein said information representative of a respective priority of each of said plurality of servers is based upon at least one of a configurable priority associated with device-server configuration, tested available connectivity of said each of said plurality of servers, and an attempt to place a call through said each of said plurality of servers.

7. The method according to claim 1, further including the step of:

(d) in response to step (a) detecting a failure in available connectivity between said device and one of said plurality of servers, causing said device to automatically send, to a voice-over-IP service provider, a message that notifies said service provider of said failure.

8. The method according to claim 1, wherein step (a) comprises causing said device to automatically test available connectivity between said device and a respective one of said servers by automatically placing a simulated call from said device, that exercises said available connectivity with said respective one of said servers, without actually attempting to call another voice-over-IP device.

9. The method according to claim 1, wherein step (a) comprises causing said device to automatically test available connectivity between said device and a respective one of said servers by automatically sending, to said server, a stimulus, other than a call or simulated call, that is effective to elicit a response from said respective one of said servers.

10. The method according to claim 9, wherein said stimulus is based upon said voice-over IP protocol.

11. A method of controlling placement of a call from a voice-over-internet protocol (IP) communication subscriber device comprising the steps of:

(a) causing said device to automatically test available connectivity between said voice-over-IP communication subscriber device and each of a plurality of servers by eliciting a response from each server in the plurality of servers without establishing a connection for a call by transmitting a Session Initiation Protocol (SIP) request to each server, and if a server fails to respond to a SIP request after a predetermined number of times when the SIP request was transmitted to the respective server to elicit a response, then simulating a response from the server that had not responded to the SIP request using another mechanism that supports voice-over-Internet protocol to determine if the unresponsive server can establish a connection and receive a voice-over-internet protocol call, and based on the results of the testing, updating a connection status in a server table that stores data regarding the priority of servers to be called if a voice-over-Internet call is to be made;

(b) causing said device to automatically select a server having a higher priority based on the priority of connection status as stored in the server table; and (c) causing said device to attempt to place said call through said selected one of said plurality of servers.

12. The method according to claim 11, wherein said information representative of a respective priority of each of said plurality of servers is based upon at least one of a configurable priority associated with device-server configuration, tested available connectivity of said each of said plurality of servers, and an attempt to place a call through said each of said plurality of servers.

13. The method according to claim 12, wherein said tested available connectivity of said each of said plurality of servers is derived by causing said device to automatically repetitively test, at times other than when placement of a call is being attempted, said available connectivity between said device and each of said plurality of servers.

14. The method according to claim 13, wherein step (a) comprises automatically updating said information contained in said table in accordance with automatic repetitive testing of said available connectivity between said device and each of a plurality of servers, and wherein step (b) comprises causing said device to automatically select said one of said plurality of servers in accordance with said information updated in step (a).

15. A method of controlling the operation of a voice-over-internet protocol (IP) communication subscriber device comprising the steps of:

(a) causing said voice-over-IP communication subscriber device to automatically test available connectivity between said device and each of a plurality of servers by automatically placing, from said device, a simulated call, or stimulus other than an actual call or simulated call, that exercises said available connectivity with and is effective to elicit a response from each of said servers by eliciting a response from each server in the plurality of servers without establishing a connection for a call by transmitting a Session Initiation Protocol (SIP) request to each server, and if a server fails to respond to a SIP request after a predetermined number of times when the SIP request was transmitted to the respective server to elicit a response, then simulating a response from the server that had not responded to the SIP request using another mechanism that supports voice-over-internet protocol to determine if the unresponsive server can establish a connection and receive a voice-over-internet protocol call, and based on the results of the testing, updating a connection status in a server table that stores data regarding the priority of servers to be called if a voice-over-internet call is to be made; and (b) in response to step (a) detecting a failure in available connectivity between said device and any of said plurality of servers, causing said device to automatically send, to a voice-over-IP service provider, a message that notifies said service provider of said failure causing said device to automatically select a server having higher priority based on the priority of connection status as stored in the server table and based on the connectivity automatically tested and causing the device to attempt to place the call through the selected one of the plurality of servers.

16. The method according to claim 15, wherein step (b) further comprises, in response to step (a) verifying connectivity between said device and a prescribed one of said plurality of servers, causing said device to attempt to place a call through said prescribed one of said plurality of servers.

17. The method according to claim 16, wherein step (a) comprises causing said device to automatically repetitively test, at times other than when placement of a call is being attempted, said available connectivity between said device and each of said plurality of servers.

18. The method according to claim 17, and further comprising:
   automatically updating said information contained in said table in accordance with automatic repetitive testing of said available connectivity between said device and each of a plurality of servers, and wherein
   step (b) comprises causing said device to attempt to place a call through one of said plurality of servers selected in accordance with said information updated in step (a).

19. The method according to claim 18, wherein step (a) further comprises storing, in said table, information representative of a respective priority of each of said plurality of servers, and wherein
   step (b) comprises causing said device to attempt to place a call through said one of said plurality of servers in accordance with said updated information and in accordance with said information representative of a respective priority of each of said plurality of servers.

20. The method according to claim 19, wherein said information representative of a respective priority of each of said plurality of servers is based upon at least one of a configurable priority associated with device-server configuration, tested available connectivity of said each of said plurality of servers, and an attempt to place a call through said each of said plurality of servers.

* * * * *